United States Patent [19]

Kajitani et al.

[11] Patent Number: 5,303,806

[45] Date of Patent: Apr. 19, 1994

[54] SPRING APPLIED-HYDRAULICALLY RELEASED CLUTCH DISC ASSEMBLY

[75] Inventors: Kouji Kajitani; Minoru Abe; Tetuji Takano, all of Neyagawa, Japan

[73] Assignee: Kabuskiki Kaisha Daikin Seisakusho, Osaka, Japan

[21] Appl. No.: 37,533

[22] Filed: Mar. 26, 1993

Related U.S. Application Data

[63] Continuation of Ser. No. 820,691, Jan. 27, 1992, abandoned.

[30] Foreign Application Priority Data

May 30, 1990 [JP] Japan .................. 2-142398

[51] Int. Cl.⁵ ................ F16D 13/70; F16D 25/08
[52] U.S. Cl. ................ 192/70.27; 192/91 A; 192/98; 192/89 BL
[58] Field of Search ........... 192/70.27, 85 CA, 89 PL, 192/91 A, 98

[56] References Cited

U.S. PATENT DOCUMENTS

| | | | |
|---|---|---|---|
| 1,415,841 | 5/1922 | Seitz | 192/98 X |
| 1,424,036 | 7/1922 | Roos | 192/98 X |
| 1,732,965 | 10/1929 | Carhart | 192/70.27 X |
| 2,345,860 | 4/1944 | Scott-Iverson | 192/91 A X |
| 2,668,610 | 2/1954 | Backus | 192/70.27 X |
| 2,901,066 | 8/1959 | Garmager | 192/91 A X |

FOREIGN PATENT DOCUMENTS 49-92449  9/1974  Japan .
58-5532   1/1983  Japan .
61-228128 10/1986 Japan .

Primary Examiner—Richard M. Lorence
Attorney, Agent, or Firm—Armstrong, Westerman, Hattori, McLeland & Naughton

[57] ABSTRACT

A clutch unit in which a facing (9) of a clutch disc (5) is disposed between a flywheel (1) and a pressure plate (6) so as to engage and disengage the clutch unit by moving the pressure plate (6) in its axial direction; a projection (6a) extending to an axis side is formed integrally on the pressure plate (6), a release bearing (20) is made directly engage with the projection (6a), and a release sleeve (24) supporting the release bearing (20) is made movable in the axial direction by a hydraulic cylinder (23).

1 Claim, 2 Drawing Sheets

SPRING APPLIED-HYDRAULICALLY RELEASED CLUTCH DISC ASSEMBLY

This application is a continuation application of Ser. No. 07/820,691 filed Jan. 27, 1992, now abandoned.

TECHNICAL FIELD

This invention relates to a clutch unit, in which a facing of a clutch disc is disposed between a flywheel and a pressure plate so as to engage and disengage the clutch unit by moving the pressure plate in an axial direction.

BACKGROUND ART

FIG. 2 shows a conventional embodiment of pull-type clutch, in which a diaphragm spring 31 is supported by a clutch cover 2 at its outer peripheral fulcrum point, contacts with a pressure plate 6 at its intermediate fulcrum point, and engages with a release sleeve 33 at its inner peripheral fulcrum point. That is, the diaphragm spring 31 serves to apply an urging load to the pressure plate 6 and also serves as a transmission lever which transmits a release force from the release sleeve 33 to the pressure plate 6 at time of releasing the clutch.

However, when the diaphragm spring is utilized in this way, a structure of the diaphragm spring 31 itself will become a complicated shape having so-called many radial slits. Further, a stroke loss due to deflection of the diaphragm spring 31 is produced to cause a decrease in a transmission efficiency of the release force, so that a release operation performance will become unstable.

Object of the Invention

An object of this invention is to decrease a loss of release stroke and to improve a release operation performance.

DISCLOSURE OF THE INVENTION

Technical Measure

In order to accomplish the above object, this invention provides a clutch unit, in which a facing of a clutch disc is disposed between a flywheel and a pressure plate so as to engage and disengage the clutch unit by moving the pressure plate in its axial direction; characterized by that a projection extending to an axis side is formed integrally on the pressure plate, a release bearing is made directly engage with the projection, and a release sleeve supporting the release bearing is made movable in the axial direction by means of a hydraulic cylinder.

Function

A hydraulic cylinder is actuated to move a release bearing in an axial direction, so that a pressure plate is directly pulled by the release bearing so as to release a clutch.

BEST MODE FOR CARRYING OUT THE INVENTION

Figure 1:
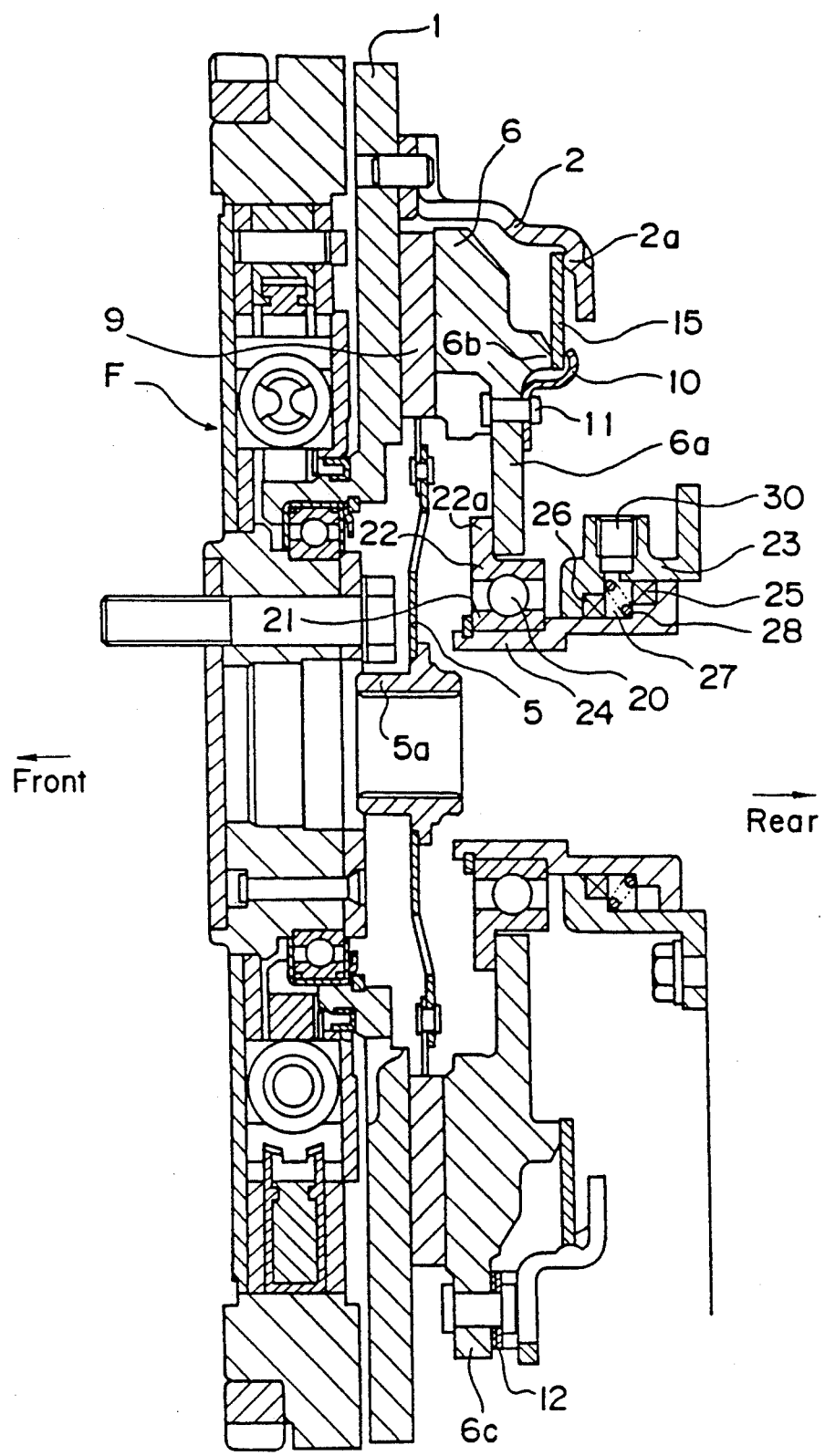
FIG. 1 is a vertical sectional view of a clutch unit to which this invention is applied.
Figure 2:
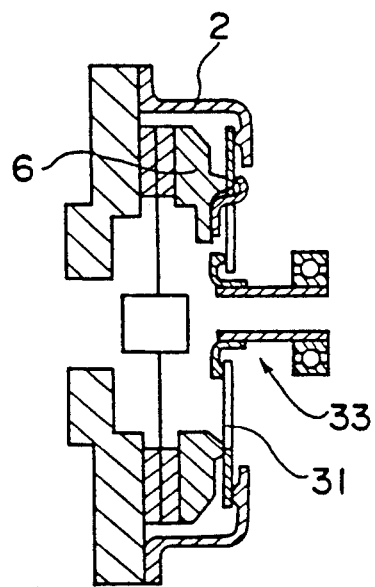
FIG. 2 is a vertical sectional view of a conventional clutch unit.

In FIG. 1 showing the vertical sectional view of the clutch unit to which this invention is applied, a flywheel 1 of clutch is connected to an engine output shaft through a flywheel damper F. In a clutch cover 2 secured to a rear end face of the flywheel 1; a facing 9 of a clutch disc 5 and a pressure plate 6 are disposed in this order from the flywheel side. An inner peripheral spline hub 5a of the clutch disc 5 spline fits onto a not-shown output shaft. The pressure plate 6 is connected at its outer peripheral projection 6c to the clutch cover 2 through plural strap plates 12 in such a way as movable in the axial direction.

A fulcrum land 6b extending backward is formed on a rear end face of the pressure plate 6. A coned disc spring 15 is compressedly installed between the fulcrum land 6b and a projection 2a at a rear end wall of the clutch cover 2, so that the pressure plate 6 is urged forward by the coned disc spring 15 to be pressed onto the facing 9. An inner peripheral end of the coned disc spring 15 is clamped to the fulcrum land 6b by a clip 10, and the clip 10 is fastened to the pressure plate 6 by a rivet 11.

A annular projection 6a extending to the axis side is integrally formed on an inner peripheral surface at a rear side of the pressure plate 6. On the other hand, an outward annular collar 22a is integrally formed on an outer race 22 of a release bearing 20 disposed at the axis side, and a rear surface of the annular collar 22a contacts with the foregoing projection 6a. An inner race 21 of the release bearing 20 is secured to a release sleeve 24 immovably in the axial direction.

A rear portion of the release sleeve 24 fits in a hydraulic cylinder 23 through a seal 25 and a seal 26, and an oil chamber 27 in the hydraulic cylinder 23 connects to a not-shown hydraulic mechanism through an oil port 30. When working oil is supplied in the oil chamber 27, the release sleeve 24 is moved backward. A cone-shaped stopper/damper spring 28 is disposed in the oil chamber 27 in such a way as compressible in the axial direction.

Function will be described hereunder. In FIG. 1 showing the engaged state of clutch, the oil chamber 27 of the hydraulic cylinder 23 is under an opened state and the pressure plate 6 is urged against the facing 9 by an elastic force of the coned disc spring 15.

In order to release the clutch, working oil is supplied to the oil chamber 27 of the hydraulic cylinder 23 by means of the hydraulic mechanism. Then, the release bearing 20 is integrally moved backward together with the release sleeve 24, and the pressure plate 6 is moved backward directly by the annular collar 20a against the coned disc spring 15 so as to leave the pressure plate 6 from the facing 9.

ANOTHER MODE FOR CARRYING OUT THE INVENTION

The projection 6a at the inner peripheral side of the pressure plate 6 is formed into the annular projectional shape in FIG. 1, however, this may be formed into a projection having a structure in which slits for cooling air are disposed radially.

Further, this invention is not limited to the clutch connected to the engine output shaft through the flywheel damper F as illustrated in FIG. 1, but may also be applied to a clutch in which the flywheel 1 is directly connected to the engine output shaft and a damper is equipped to the clutch disc.

EFFECT OF THE INVENTION

As described above, in this invention, the projection 6a integrally formed on the pressure plate 6 is made engage directly with the release bearing 20, and the release sleeve 24 supporting the release bearing 20 is so designed as to be movable in the axial direction by the hydraulic cylinder 23. Accordingly, the release force can be directly transmitted to the pressure plate 6 by the hydraulic cylinder 23 not through lever parts such as the diaphragm spring etc. Therefore, the loss of release stroke is not produced, so that the transmission efficiency of release force can be increased and the release operation performance can be improved.

Moreover, in order to apply the urging load on the pressure plate 6, the spring may be used which has a simple structure merely installed compressedly between the clutch cover 2 and the pressure plate 6.

INDUSTRIAL APPLICABILITY

A loss of release stroke is eliminated and a release operation performance is improved. The clutch unit according to the invention is best suited for those for automobiles.

What is claimed is:

1. A clutch unit having a flywheel adapted to be connected to an engine output shaft, a clutch cover secured to a rear face of said flywheel, a pressure plate mounted on said clutch cover and facing said flywheel and a clutch disc having a friction facing on its outer periphery disposed between said flywheel and said pressure plate for engagement and disengagement of said friction facing between said flywheel and said pressure plate by axially moving said pressure plate in a direction toward and away from said flywheel, said pressure plate having a projection extending radially inward of said pressure plate, spring means between said clutch cover and said pressure plate resiliently urging said pressure plate toward said flywheel for engaging said friction facing of said clutch disc between said pressure plate and said flywheel, a release bearing having a radially inner race and a radially outer race, said outer race having a radially outwardly extending projection in contact with said radially inward projection of said pressure plate and an inner race, a release sleeve supporting said inner race of said release bearing and movable in an axial direction toward and away from said clutch disc and a hydraulic cylinder for moving said release sleeve and said release bearing away from said clutch disc for axially moving said radial projection of said outer release bearing race and said pressure plate away from said pressure plate away from spring disposed in an oil chamber of said hydraulic cylinder and compressible in an axial direction as said spring means resiliently urges said pressure plate toward said flywheel when said hydraulic cylinder is deactivated.

* * * * *

UNITED STATES PATENT AND TRADEMARK OFFICE
CERTIFICATE OF CORRECTION

PATENT NO.  : 5,303,806
DATED       : April 19, 1994
INVENTOR(S) : Kajitani et al It is certified that error appears in the above-indentified patent and that said Letters Patent is hereby corrected as shown below:

On the title page: Item [30] insert -- May 9, 1991 [WO] ............ PCT/JP91/00617 --.

Signed and Sealed this

Nineteenth Day of December, 1995

Attest:

BRUCE LEHMAN

*Attesting Officer*       *Commissioner of Patents and Trademarks*